(12) United States Patent
Hafeez et al.

(10) Patent No.: US 8,811,974 B2
(45) Date of Patent: Aug. 19, 2014

(54) COORDINATED MULTIPOINT WIRELESS COMMUNICATION

(75) Inventors: Abdulfauf Hafeez, Cary, NC (US);
Jiann-Ching Guey, Cary, NC (US);
Sven Oscar Petersson, Sävedalen (SE);
Kambiz Zangi, Chapel Hill, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 675 days.

(21) Appl. No.: 12/346,358

(22) Filed: Dec. 30, 2008

(65) Prior Publication Data

US 2010/0167717 A1    Jul. 1, 2010

(51) Int. Cl.
*H04W 4/00* (2009.01)

(52) U.S. Cl.
USPC ......... 455/422.1; 455/25; 455/63.4; 455/522; 455/523; 455/562.1; 342/359; 342/372; 342/422; 342/423; 343/776; 343/777

(58) Field of Classification Search
USPC ............ 455/452.2, 522, 562.1, 25, 63.4, 523, 455/422.1; 342/359, 367, 374, 423, 430; 343/767, 776
See application file for complete search history.

(56) References Cited

U.S. PATENT DOCUMENTS

| | | | |
|---|---|---|---|
| 2003/0153361 A1* | 8/2003 | Mori et al. | 455/562 |
| 2005/0059342 A1* | 3/2005 | Engels et al. | 455/7 |
| 2006/0276229 A1* | 12/2006 | Braun et al. | 455/562.1 |
| 2008/0009244 A1* | 1/2008 | Lee | 455/69 |
| 2009/0023477 A1* | 1/2009 | Staudte | 455/562.1 |

OTHER PUBLICATIONS

Ibing et al.: "Joint Transmission and Detection in Hexagonal Grid for 3GPP LTE" Jan. 23, 2008, Information Networking, 2008. Icoin 2008. International Conference on, IEEE, Piscataway, NJ, USA, pp. 1-5.
Song et al.: "Collaborative MIMO, IEEE C802.16m-07/244r1" [Online] Nov. 7, 2007, IEEE 802.16 Broadband Wireless Access Working Group, pp. 1-9.
Samsung: "Inter-Cell Interference Mitigation Through Limited Coordination" Aug. 12, 2008, 3GPP Draft; R1-082886 Inter-Cell Interference Mitigation Through Limited Coordination, 3rd Generation Partnership Project (3GPP), Mobile Competence Centre; 650, Route Des Lucioles, chapters 1-4.
Yeh et al. "Frame Structure to Support Inter-cell Interference Mitigation for Downlink Traffic Channel using Co-MIMO and FFR"I [Online] Jan. 16, 2008, IEEE 802.16M-08/017, pp. 1-8.

* cited by examiner

*Primary Examiner* — Kwasi Karikari

(57) ABSTRACT

Multipoint wireless communications are coordinated in cells with radiation that is emanated from antennas in an inward direction. In an example embodiment, an apparatus includes a first antenna, a second antenna, a third antenna and a controller. The first antenna emanates radiation from a first location in an inwardly direction for a cell. The second antenna emanates radiation from a second location in an inwardly direction for the cell. The third antenna emanates radiation from a third location in an inwardly direction for the cell. The controller coordinates the emanation of the radiation via the first, second, and third antennas so as to reduce intra-cell interference for remote terminals located within the cell. The coordination may be effected in accordance with one or more coordinated multi-point (transmission/reception) (CoMP) techniques. Different numbers of sub-cells and antennas per cell and different CoMP cell organizations may be implemented.

20 Claims, 8 Drawing Sheets

COORDINATED MULTIPOINT WIRELESS COMMUNICATION

TECHNICAL FIELD

The present invention relates generally to wireless communications systems, and in particular, but by way of example only, to coordinating radiation that emanates from multiple antennas of a cell.

BACKGROUND

Many specialized terms and abbreviations are used in the communications arts. At least some of the following are referred to within the text that follows, such as in this background and/or the description sections. Thus, the following terms and abbreviations are herewith defined:

| | |
|---|---|
| CoMP | Coordinated Multi-Point (transmission/reception) |
| CPU | Central Processing Unit |
| ICI | Inter-Cell Interference |
| RT | Remote Terminal |
| SIR | Signal to Interference Ratio |
| UE | User Equipment |

Electronic communication forms the backbone of today's information-oriented society. Electronic communications are transmitted over wireless or wired channels using electromagnetic radiation. The availability and capacity of electronic communications is typically limited by the bandwidth of the communications channel. Especially in wireless environments, the bandwidth of a communications channel may be limited by the finite nature of the electromagnetic spectrum.

Certain schemes enable more information to be communicated in a given spectrum allocation. This efficient utilization of spectrum can reduce the cost of communication services being provided, enable richer communication services to be provided, or both.

Example communication schemes include sharing spectrum in frequency, space, and/or time; compressing information; coding information; modulating data signals; combinations thereof, and so forth. Different communication paradigms rely on such communication schemes to varying degrees to efficiently utilize spectrum. An example of a relatively modern communication paradigm is that of cellular systems. With cellular systems, a geographic area is divided into cells. This enables a frequency or set of frequencies to be reused in different cells.

Cellular systems may be designed using different approaches. One approach uses coordinated multi-point transmission/reception (CoMP) cells. A conventional CoMP cell includes antennas that are spatially distributed in a geographical location and connected to a central processing unit (CPU) via a backhaul. The CPU coordinates transmissions to multiple user equipments (UEs) in the cell via the distributed antennas. It has been shown that relatively high user and sum data throughputs can be achieved in the downlink by broadcasting information to multiple UEs in a conventional CoMP cell.

FIG. 1 depicts a conventional CoMP cell layout 100 with three 120° sectors per cell in which the cells are hexagonal. In each conventional CoMP cell, one site includes three antennas. Each antenna corresponds to one of the three sectors of the cell, but each cell has its own antenna site. Throughout the drawings, the sectors are demarcated by relatively "thinner" lines, and the cells are demarcated by relatively "thicker" lines. Although the cells are hexagonal in shape, each sector is diamond-shaped.

FIG. 2 depicts a conventional CoMP cell layout 200 with three 120° sectors per cell in which the sectors are hexagonal. Three 120°-sector antennas are placed at a site in the middle of each cell. Each cell has its own antenna site. As shown by the relatively "thicker" lines, each of the cells is formed from three hexagonal sectors.

FIG. 3 depicts a conventional CoMP cell layout 300 with nine 120° sectors per cell in which the sectors are hexagonal. Three 120°-sector antennas are placed at three different sites in each cell. Thus, each cell has three of its own antenna sites. With three 120°-sector antennas at three different sites, the nine sectors per cell are covered.

A large geographical area can be covered by dividing it into multiple conventional CoMP cells. However, because the transmissions in these cells are not coordinated among different cells, inter-cell interference (ICI) arises. Unfortunately, the ICI limits the system throughput. Although ICI affects most cells to at least some degree, the effect of ICI is all the more severe in small cells because the cell border region forms a relatively significant portion of the overall cell area. Thus, the potential benefits of conventional CoMP cells are dramatically negatively impacted by the interference that is created between and among different cells.

Consequently, there is a need to address these deficiencies in the current state of the art. Such deficiencies and other needs are addressed by one or more of the various described embodiments of the present invention.

SUMMARY

It is an object of certain embodiment(s) of the present invention to at least mitigate or ameliorate some of the deficiencies of conventional approaches.

It is another object of certain embodiment(s) of the present invention to reduce ICI in cellular systems.

It is yet another object of certain embodiment(s) of the present invention to reduce ICI in cellular systems with multiple antenna sites per cell.

Generally, multipoint wireless communications are coordinated in cells with radiation that is emanated from antennas in an inward direction. In an example embodiment, an apparatus includes a first antenna, a second antenna, a third antenna and a controller. The first antenna emanates radiation from a first location in an inwardly direction for a cell. The second antenna emanates radiation from a second location in an inwardly direction for the cell. The third antenna emanates radiation from a third location in an inwardly direction for the cell. The controller coordinates the emanation of the radiation via the first, second, and third antennas so as to reduce intra-cell interference for remote terminals located within the cell.

In example implementations, the coordination in cells may be effected in accordance with one or more coordinated multi-point (transmission/reception) (CoMP) techniques. A cell may include multiple sub-cells, with each sub-cell comprising, for example, a sector of a cell. Different numbers of sub-cells and antennas per cell and different CoMP cell organizations may be implemented. The antenna locations may be positioned at cell borders. A single antenna site location may be shared by antennas from two or more cells in a system.

In another example embodiment, a method for coordinated multipoint wireless communication includes acts of emanating radiation via first, second, and third antennas and coordinating the emanations. Radiation is emanated from a first location via a first antenna in an inwardly direction for a cell.

Radiation is emanated from a second location via a second antenna in an inwardly direction for the cell. Radiation is emanated from a third location via a third antenna in an inwardly direction for the cell. The emanation of the radiation via the first antenna, the second antenna, and the third antenna is coordinated so as to reduce intra-cell interference for remote terminals located within the cell. In an example implementation, radiation is also received via the first, second, and third antennas with a focus on an inward direction of the cell and the reception via the antennas is coordinated to reduce the intra-cell interference.

In yet another example embodiment, a system for coordinated multipoint wireless communication includes a first communications apparatus and a second communications apparatus. The first communications apparatus includes multiple antennas to emanate radiation from multiple locations in an inwardly direction for a first cell. The first communications apparatus also includes a first controller to coordinate emanation of the radiation via the multiple antennas of the first communications apparatus so as to reduce intra-cell interference for remote terminals located within the first cell. The second communications apparatus includes multiple antennas to emanate radiation from multiple locations in an inwardly direction for a second cell. The second communications apparatus includes a second controller to coordinate emanation of the radiation via the multiple antennas of the second communications apparatus so as to reduce intra-cell interference for remote terminals located within the second cell. The first and second communications apparatuses may be distributed.

In an example implementation for a system, interference in the first cell by the radiation of the second cell is mitigated by the inward direction of the emanations from the multiple antennas of the second communications apparatus. Similarly, interference in the second cell by the radiation of the first cell is mitigated by the inward direction of the emanations from the multiple antennas of the first communications apparatus. In another example implementation for a system, at least the first cell includes multiple sub-cells. Each respective antenna of the multiple antennas of the first communications apparatus further emanates radiation in an inwardly direction for a respective sub-cell of the multiple sub-cells.

An advantage of certain embodiment(s) of the present invention is that ICI in cellular systems with multiple antenna sites per cell may be reduced.

Another advantage of certain embodiment(s) of the present invention is that higher data rates may be provided in cells with multiple antenna sites by inwardly directing radiation that emanates from antennas located at cell borders.

Additional embodiments are described and/or claimed herein. Example additional embodiments include, by way of example but not limitation, methods, devices, arrangements, memory, systems, and so forth. Additional aspects of the invention are set forth in part in the detailed description, drawings, and claims that follow, and in part may be derived from the detailed description and drawings, or can be learned by practice of the invention. It is to be understood that both the foregoing general description and the following detailed description are exemplary and explanatory only and are not restrictive of the invention as disclosed or as claimed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
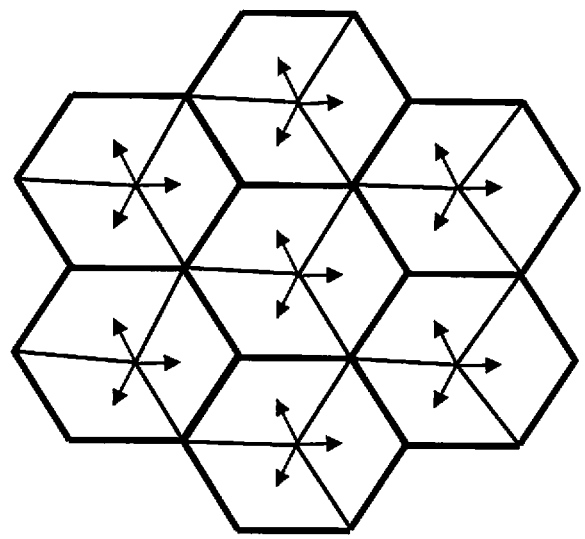
FIG. 1 depicts a conventional coordinated multi-point transmission/reception (CoMP) cell layout with three sectors per cell in which the cells are hexagonal.
Figure 2:
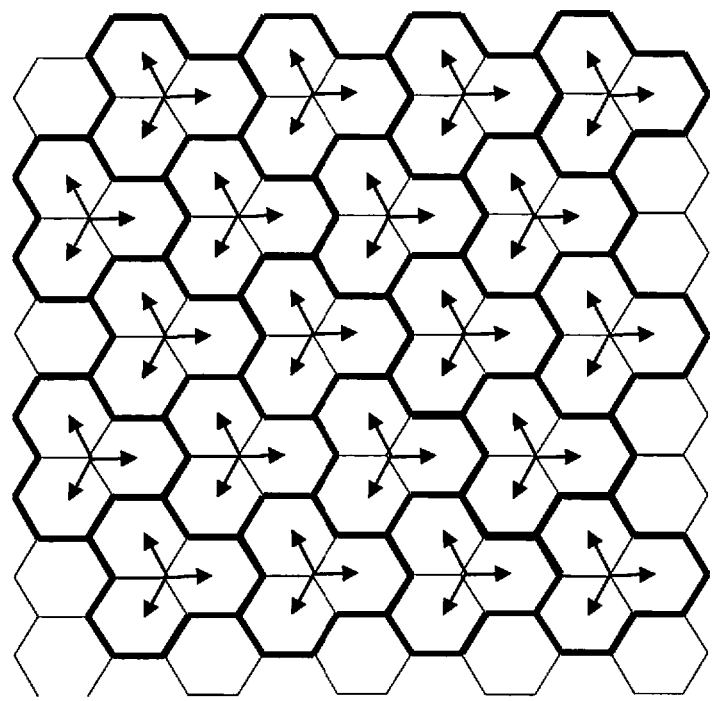
FIG. 2 depicts a conventional CoMP cell layout with three sectors per cell in which the sectors are hexagonal.

In short, existing approaches are deficient inasmuch as they fail to counteract the deleterious affects of ICI, which is a particular problem for cellular systems with multiple antenna sites per cell. With reference to the conventional CoMP cell layouts 100, 200, and 300 (of FIGS. 1, 2, and 3), the boresight pointing directions of the antennas are outward from the cell center as represented by the arrows. For conventional CoMP cell layouts 100 and 200, the single antenna site per cell has three arrows that point outward from the cell center. For conventional CoMP cell layout 300, each of the three antenna sites per cell has at least two arrows that point outward from the cell center.

In contradistinction, example embodiments as described herein relate to wireless communication systems having multiple antenna sites per cell that reduce ICI. More specifically, cellular organizations are described that reduce ICI in distributed antenna system using directional antennas. An example of a directional antenna is a sector antenna.

ICI may be reduced by making the boresight pointing directions of the antennas at cell borders to be inward (e.g., toward the respective cell centers). Consequently, for the same cell coverage and the same number of antenna sites as a conventional multiple-site cell, cells organized in accordance with certain embodiments as described herein offer higher system throughput. The multiple-site cells may be configured as, for example, CoMP cells.

Figure 4:
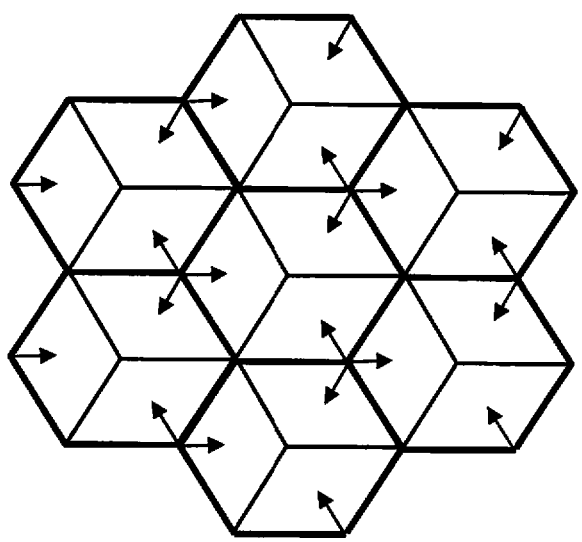
FIG. 4 illustrates an example CoMP cell organization in which the cells are hexagonal and radiation is directed inwardly.

FIG. 4 illustrates an example CoMP cell organization 400 in which the cells are hexagonal and radiation is directed inwardly. As also noted herein above, the sectors are demarcated by relatively "thinner" lines, and the cells are demarcated by relatively "thicker" lines. As illustrated, each hexagonal cell includes three 120° sectors. Each sector is shaped like a diamond. Antenna sites may be shared by multiple adjacent cells (e.g., shared among three cells).

The sector antennas point inward approximately toward the center of each cell from the border region thereof. More specifically, each antenna emanates radiation such that the boresight pointing directions, as represented by the arrows, are approximately inward toward the center of each cell. The boresight pointing direction may be considered the direction of maximum antenna gain. This is in contrast with the pointing directions of conventional CoMP cell layout 100 (of FIG. 1), which has antennas that point outward toward the cell border.

Figure 5:
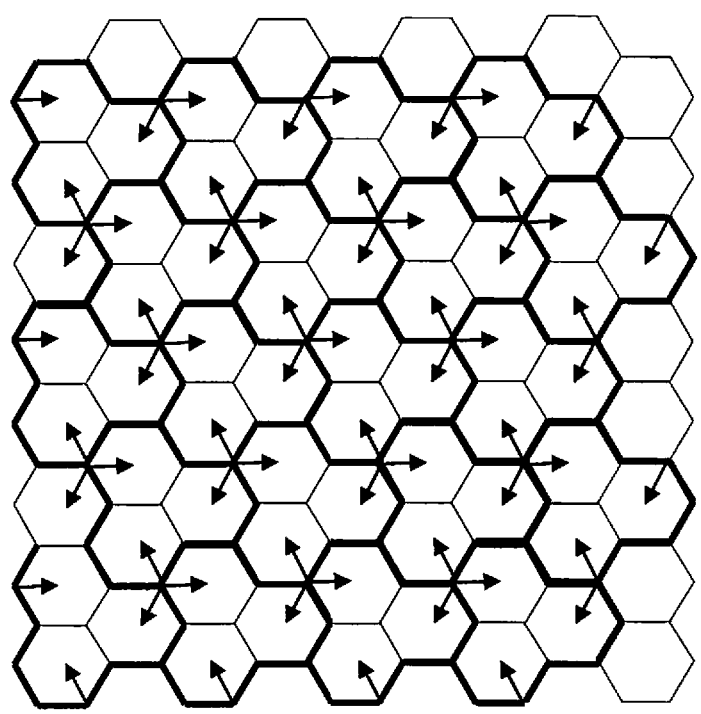
FIG. 5 illustrates an example CoMP cell organization in which there are three hexagonal sectors per cell and radiation is directed inwardly.

FIG. 5 illustrates an example CoMP cell organization 500 in which there are three hexagonal sectors per cell and radiation is directed inwardly. Thus, CoMP cell organization 500 differs from CoMP cell organization 400 (of FIG. 4) in the shapes of the cells and sectors. More specifically, CoMP cell organization 400 has diamond-shaped sectors that form hexagonal cells, and CoMP cell organization 500 has hexagon-shaped sectors that form honey-comb-shaped cells.

As illustrated with CoMP cell organization 500, each cell contains three sector antennas placed at (e.g., on or near) the cell boundary. The sector antennas may be 120° sector antennas. Antenna sites may be shared by multiple adjacent cells (e.g., shared among three cells). The boresight pointing directions of the antennas are inward, albeit not exactly toward the cell center.

These inward directions of CoMP cell organization 500 are in contrast with the pointing directions of conventional CoMP cell layout 200 (of FIG. 2), which has centrally-located antennas that point outward toward the cell border. Both cell system designs (of FIGS. 2 and 5) may have the same antenna site density, at least when the antenna placements along the outer edge of the system are discounted.

Typically, the regions close to the border of a cell experience high ICI arising from adjacent cells. ICI in the border regions of a cell can be observed by considering the radiation patterns for sector antennas in the presence of propagation loss.

Figure 6:
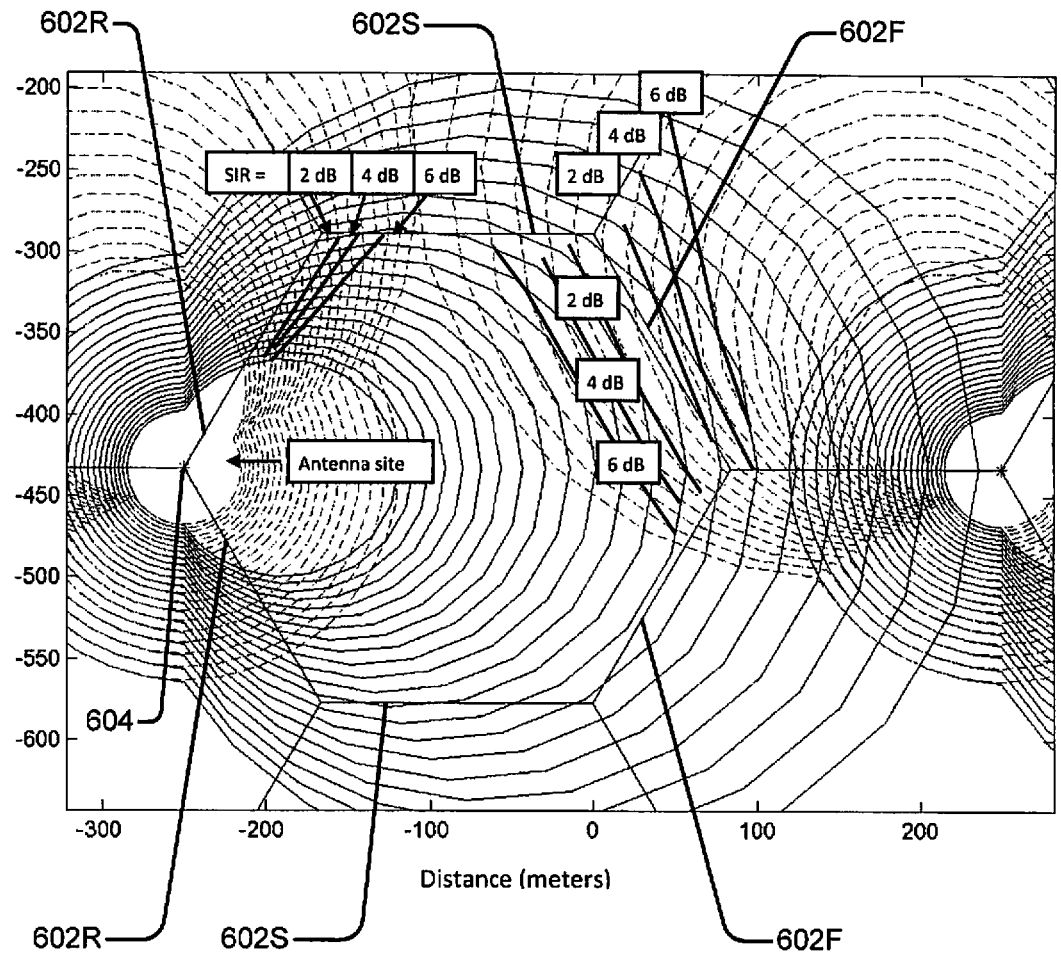
FIG. 6 shows example radiation patterns for 120°-sector antennas in the presence of propagation loss.

FIG. 6 shows example radiation patterns 600 for 120°-sector antennas in the presence of propagation loss. A 3-sector antenna pattern and propagation loss model (e.g., Urban Macro) may be provided as follows:

$$A(\theta) = -\min\left[12\left(\frac{\theta}{\theta_{3dB}}\right)^2, A_m\right], \text{ where } -180° \le \theta \le 180°$$

and

Path Loss=34.5+35 log($d$), respectively. Here, $\theta$ is the azimuth angle in degrees, $A(\theta)$ is the antenna gain in dB, $A_m$=20 dB is the maximum attenuation, $\theta_{3\ dB}$=70° is the 3 dB beamwidth, and d is the distance from the antenna in meters. The carrier frequency is given to be 1900 MHz. The inter-site distance is set to be 500 meters. The contours of radiation patterns 600 shown around the antenna sites represent regions of constant signal strength in steps of 1 dB. In other words, each exterior contour decreases 1 dB in signal strength.

Considering interference arising from adjacent sectors, while excluding interference from other sectors, the signal to interference ratio (SIR) experienced in border regions is illustrated in FIG. 6. Let the front, side, and rear border segments (two of each) of a hexagonal sector be defined as the border segments 602 at ±20°, ±40°, and ±60° from the boresight pointing direction of the sector antenna. Front border segments 602F, side border segments 602S, and rear borders segments 602R are indicated for the antenna site 604. It can be observed from radiation patterns 600 that low SIR prevails in larger border areas of a cell where the interference arises from a front or side segment of an adjacent sector as compared to a rear segment. Thus, it can be deduced that cell border regions where the sector antenna of an adjacent cell is pointed away from the region enjoy higher SIR than border regions where the antenna is pointed toward the region.

With this deduction in mind, it should be noted that each cell of the 3-sector cells of CoMP cell organization 500 (of FIG. 5) has three front segments, three side segments, and six rear segments at the border of the cell. In contrast, each 3-sector cell of conventional CoMP cell layout 200 (of FIG. 2) has six front segments, six side segments, and no rear segments at the border. Thus, it can be surmised that the cells of CoMP cell organization 500 experience better SIR in border regions than do conventional cells.

With CoMP cell organization 500, for example, it should also be noted that the regions in the middle of the cell may gain from receiving a signal from multiple own-cell sector antennas. This gain results because transmissions from own-cell sector antennas are coordinated in CoMP cells.

Although a particular propagation loss model (i.e., Urban Macro) has been used to demonstrate the system characteristics that are explained above, it is nevertheless generally true that the net path gain (e.g., the antenna gain minus path loss in dB) changes rapidly with angular movement at large azimuth angles. This results in high SIRs in the border regions near the rear segments of a sector. Consequently, the conclusions described above also hold for other channel models and directional antenna patterns.

Figure 7:
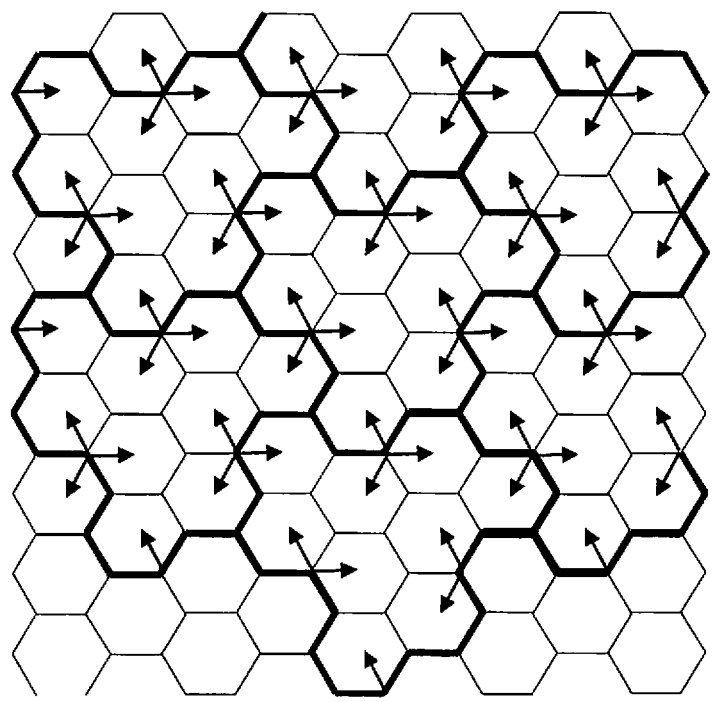
FIG. 7 illustrates an example CoMP cell organization in which there are nine hexagonal sectors per cell and radiation is directed inwardly.

FIG. 7 illustrates an example CoMP cell organization 700 in which there are nine hexagonal sectors per cell and radiation is directed inwardly. As illustrated, there are six antenna sites per cell, with each antenna site serving three sectors distributed over two different cells. For a given cell, three antennas sites serve one sector apiece, and the other three antenna sites serve two sectors apiece. Each of the antenna sites may be shared with at least one other cell.

Figure 3:
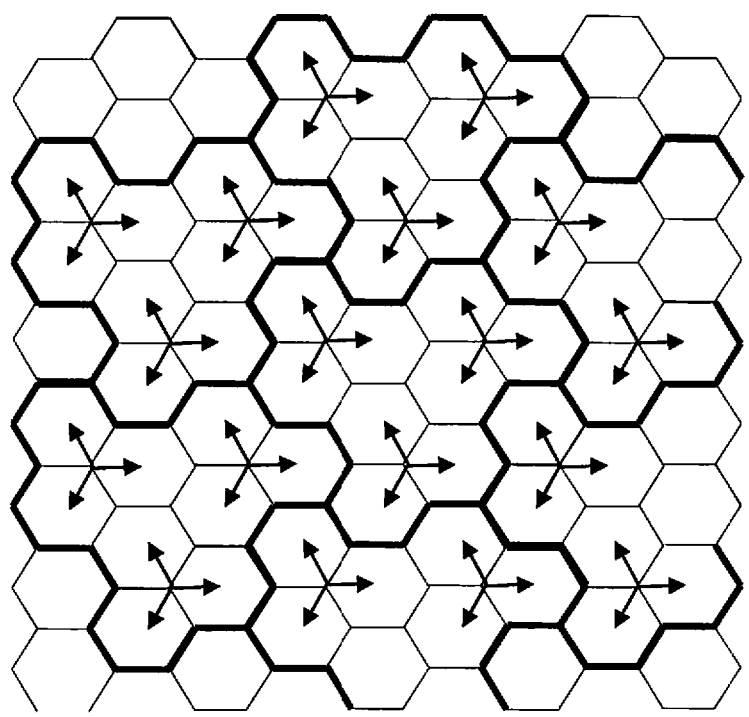
FIG. 3 depicts a conventional CoMP cell layout with nine sectors per cell in which the sectors are hexagonal.

CoMP cell organization 700 may be compared to and contrasted with conventional CoMP cell layout 300 (of FIG. 3). Conventional CoMP cell layout 300 also has nine hexagonal sectors per cell. However, some antennas of conventional CoMP cell layout 300 point outward toward the borders of their respective cells. A comparison reveals that CoMP cell organization 700 has 12 rear segments at the border of each cell, but conventional CoMP cell layout 300 has no rear segments at the border of each cell.

Figure 8:
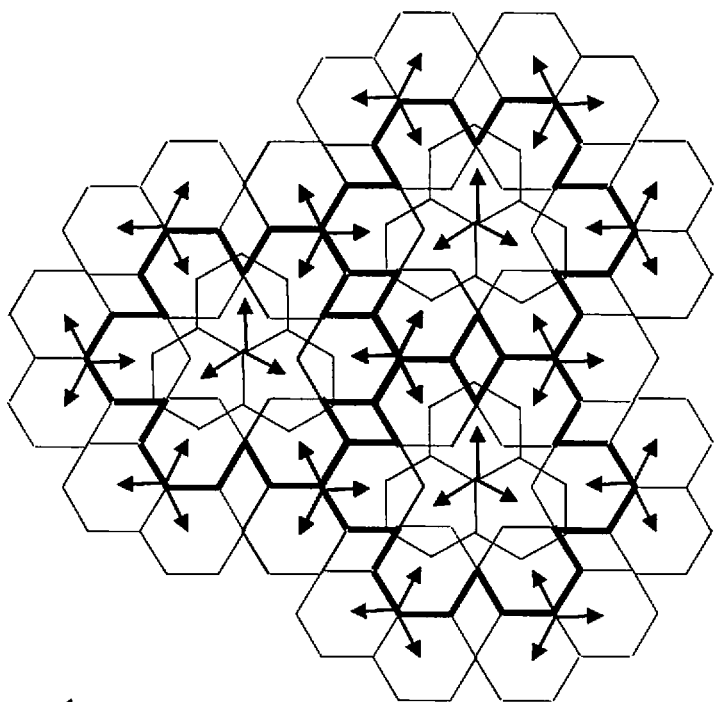
FIG. 8 illustrates another example CoMP cell organization in which there are nine hexagonal sectors per cell and radiation is directed inwardly.

FIG. 8 illustrates an example CoMP cell organization 800 in which there are nine hexagonal sectors per cell and radiation is directed inwardly. As illustrated, CoMP cell organization 800 also includes nine hexagonal (e.g., 120°) sectors per cell. Nevertheless, this nine-sector-per-cell CoMP cell organization 800 differs from the nine-sector-per-cell CoMP cell organization 700 (of FIG. 7). The three central antenna sites that point "up" represent the original orientation of the antenna sites. The six antenna sites at the cell borders are rotated so that they point inward toward the center of their respective cells.

More specifically, the antenna sites at the cell borders are rotated by ±30° azimuth angle with respect to the center site. As a result, the antennas at the cell borders point inwardly toward the center of each cell. In the nine-sector-per-cell example of CoMP cell organization 800, each antenna site at a cell border is shared by two other (e.g., three total) adjacent cells. The central antenna site with three antennas for each cell is not shared. It should be understood that radiation patterns and the corresponding coverages do not usually form true hexagons. Accordingly, the demarcation between the three cells may be considered three 120° lines (without the diamond-shaped "holes").

As a consequence of the site rotation, signal coverage in cell border areas is likely to be at least somewhat non-uniform. However, this lack of signal coverage uniformity may not be particularly important at least for urban deployments where performance is generally SIR limited. In terms of the SIR at cell borders, the cells of CoMP cell organization 800 hold an advantage over the cells of conventional CoMP cell layout 300 (of FIG. 3) because each of the antennas at a cell border points inwardly toward the center of the cell as is apparent for FIG. 8. Consequently, these inwardly pointing antennas cause relatively little ICI.

Four different CoMP cell organization examples are illustrated in FIGS. 4-5 and 7-8 and are described herein above. However, the principles that are described herein are not limited to just these examples. Instead, they may be applied to many other CoMP cell organizations by orienting the antennas placed at cell borders to point inward (e.g., toward or nearly toward the center of the cell). With radiation being directed inwardly by multiple antennas, ICI in the system may be reduced. The ICI reduction may boost SIR, at least in the cell border areas.

Figure 9:
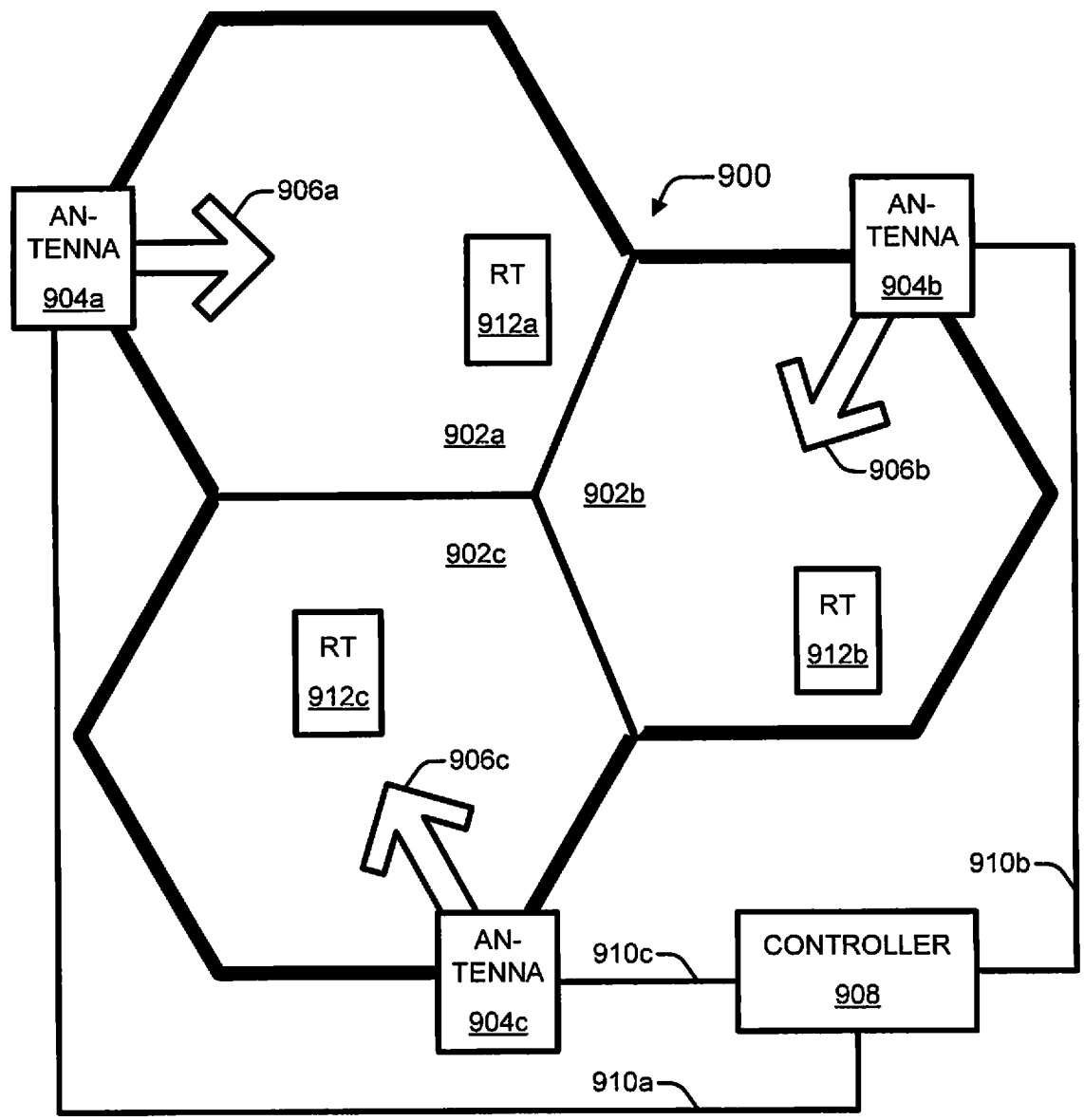
FIG. 9 is a block diagram of an example CoMP cell having three sub-cells, three antennas, and a controller to coordinate multipoint wireless communications.

FIG. 9 is a block diagram of an example CoMP cell 900 having three sub-cells 902, three antennas 904, and a controller 908 to coordinate multipoint wireless communications. As illustrated, CoMP cell 900 includes three sub-cells 902a, 902b, and 902c. Each sub-cell 902 may comprise, for example, a sector of a cell. Although 120° sectors are illustrated, other types of sectors may be implemented for CoMP cell 900 or for other embodiments.

CoMP cell 900 may correspond to, for instance, a cell of CoMP cell organization 500 (of FIG. 5). In other words, each CoMP cell 900 has three hexagonal sub-cells 902 and three antenna sites for antennas 904, with the sites being shared by two other cells. However, the principles and aspects of coordinating multipoint wireless communications that are described with reference to FIG. 9 are also applicable to other CoMP cell organizations, including but not limited to those that are illustrated in FIGS. 4 and 7-8. Although not explicitly shown in FIG. 9, each site for each antenna 904 may be emanating radiation into multiple sub-cells 902, including into multiple different CoMP cells 900.

CoMP cell 900, as illustrated in FIG. 9, further includes emanated radiation 906, a backhaul 910, and remote terminals (RTs) 912. Remote terminal 912a is shown as being located in sub-cell 902a. Remote terminal 912b is shown as being located in sub-cell 902b. Remote terminal 912c is shown as being located in sub-cell 902c. Although only three remote terminals 912 are shown (one per sub-cell 902), each CoMP cell 900 (and each sub-cell 902) may actually have multiple remote terminals 912 located therein. Remote terminals 912 may be fixed, stationary, or mobile. Remote terminals 912 may include, for example, a mobile terminal, a mobile station, a subscriber station, a UE, a communication card or module, and so forth.

Each respective sub-cell 902a, 902b, 902c is associated with a respective antenna 904a, 904b, and 904c. Each emanated radiation 906a, 906b, and 906c originates from a respective antenna 904a, 904b, and 904c. Each antenna 904 is connected to controller 908 via backhaul 910. Specifically, antenna 904a is connected via backhaul 910a, antenna 904b is connected via backhaul 910b, and antenna 904c is connected via backhaul 910c. It should be noted that individual lines of backhaul 910 may be shared between/among different antennas 904 and that controller 908 may be co-located with an antenna 904. Also, a controller 908 may be responsible for controlling the antennas 904 of multiple different CoMP cells 900.

Controller 908 may include at least one processor and one or more memories (not shown). The processor may be realized as a general-purpose or a special-purpose processor. Examples include, but are not limited to, a central processing unit (CPU), a digital signal processor (DSP), a microprocessor, some combination thereof, and so forth. Generally, such a processor is capable of executing, performing, and/or otherwise effectuating processor-executable instructions. The one or more memories store or include such processor-executable instructions that are executable by the processor to effectuate the performance of functions by controller 908. Processor-executable instructions may be embodied as software, firmware, hardware, fixed logic circuitry, some combination thereof, and so forth. A processor and processor-executable instructions of a memory may be realized separately (e.g., as a DSP executing code) or in an integrated form (e.g., as part of an application-specific integrated circuit (ASIC)).

In an example embodiment, an apparatus for coordinated multipoint wireless communication includes a first antenna 904a, a second antenna 904b, and a third antenna 904c and a controller 908. The first antenna emanates radiation 906a from a first location in an inwardly direction for a cell (e.g., a CoMP cell 900). The second antenna emanates radiation 906b from a second location in an inwardly direction for the cell. The third antenna emanates radiation 906c from a third location in an inwardly direction for the cell. Controller 908 coordinates emanation of radiation 906a,b,c via first antenna 904a, second antenna 904b, and third antenna 904c so as to reduce intra-cell interference for remote terminals 912 that are located within the cell.

As is apparent from FIG. 9, CoMP cell 900 is associated with a cell border (e.g., the "thicker" lines). In an example implementation, the first location is at a first position along the cell border, the second location is at a second position along the cell border, and the third location is at a third position along the cell border. In another example implementation, one or more border segments are rear segments for at least one antenna and its corresponding radiation direction. In other words, at least a portion of the cell border is behind first antenna 904a, for example, in relation to the inward direction for CoMP cell 900 at which the radiation 906a is emanated via first antenna 904a.

In another example implementation, first antenna 904a, second antenna 904b, and third antenna 904c are connected to controller 908 over at least one backhaul 910, and they may jointly comprise a distributed apparatus. As shown in FIG. 9, each cell 900 may include multiple sub-cells 902. With sub-cells 902, each respective antenna 904 of the multiple antennas of a distributed apparatus emanates radiation 906 in an inwardly direction for a respective sub-cell 902 of the multiple sub-cells.

It should be noted that each antenna 904 may comprise an array antenna. The array antenna may operate in both the uplink (UL) and the downlink (DL). The array antenna may function as a sector antenna in broadcast mode (e.g., for control information). The array antenna may function as a beamforming antenna when a specific remote terminal 912 is being targeted.

Thus, controller 908 may coordinate multipoint wireless communications for cell 900. When the coordination entails coordinated multi-point transmission/reception (CoMP), a different remote terminal 912 may be served in each sub-cell 902 (e.g., in a given time unit and at a particular frequency).

In other words, each respective antenna 904a,b,c may serve a different respective remote terminal 912a,b,c in a respective sub-cell 902a,b,c under the coordination of controller 908.

Serving a remote terminal 912 per sub-cell 902 is especially capable of being accomplished the closer the remote terminals are to the center of a sub-cell. However, as one or more remote terminals 912 approach a border of a sub-cell 902, controller 908 may silence (e.g., in the given time unit and particular frequency) one or multiple antennas 904 to avoid intra-cell interference. This relatively straight-forward approach may be implemented under CoMP with centralized control at the cell level by controller 908.

Alternatively, a relatively more sophisticated scheme, which is also implemented in accordance with CoMP techniques, may be implemented by controller 908. This scheme enables the serving of a remote terminal 912 per sub-cell 902 "regardless" of their location within sub-cells 902 (e.g., even if they are near sub-cell borders). Such a scheme involves determining the complex channel response and configuring the transmission or reception procedure accordingly. In other words, a transmission algorithm (for the DL) may be designed based on the complex channel response so that less interference is created in other sub-cells 902 for other remote terminals 912. Similarly, the reception algorithm (for the UL) may be designed based on the complex channel response so as to cancel interference arising from other remote terminals 912 in other sub-cells 902.

In a mathematical sense, the UL processing may entail performing a matrix inversion with linear algebra. For example, given a CoMP cell with seven sub-cells, a matrix with a size of seven is employed. More specifically, the reception environment may be modeled as: $R=H \cdot S$. The R vector represents the receive vector with a 7×1 dimensionality. The H vector represents the channel response matrix and has a 7×7 dimensionality. The channel response matrix provides a correspondence between seven remote terminals and seven antennas. The S variable represents the signal that was transmitted by the targeted remote terminal.

With a seven-sub-cell example, the CoMP processing by controller 908 accomplishes joint processing from the seven antennas. Seven signals are collected from seven antennas and combined to recover the desired signal(s) S. When the channel response is estimated, the CoMP processing is coherent by controller 908. If there is insufficient information to accurately estimate the channel response, the signal recovery may alternatively be performed incoherently. The incoherent recovery may be performed with beamforming antennas under the coordination of controller 908. Whether coherent or incoherent, DL processing may be performed analogously.

Figure 10:
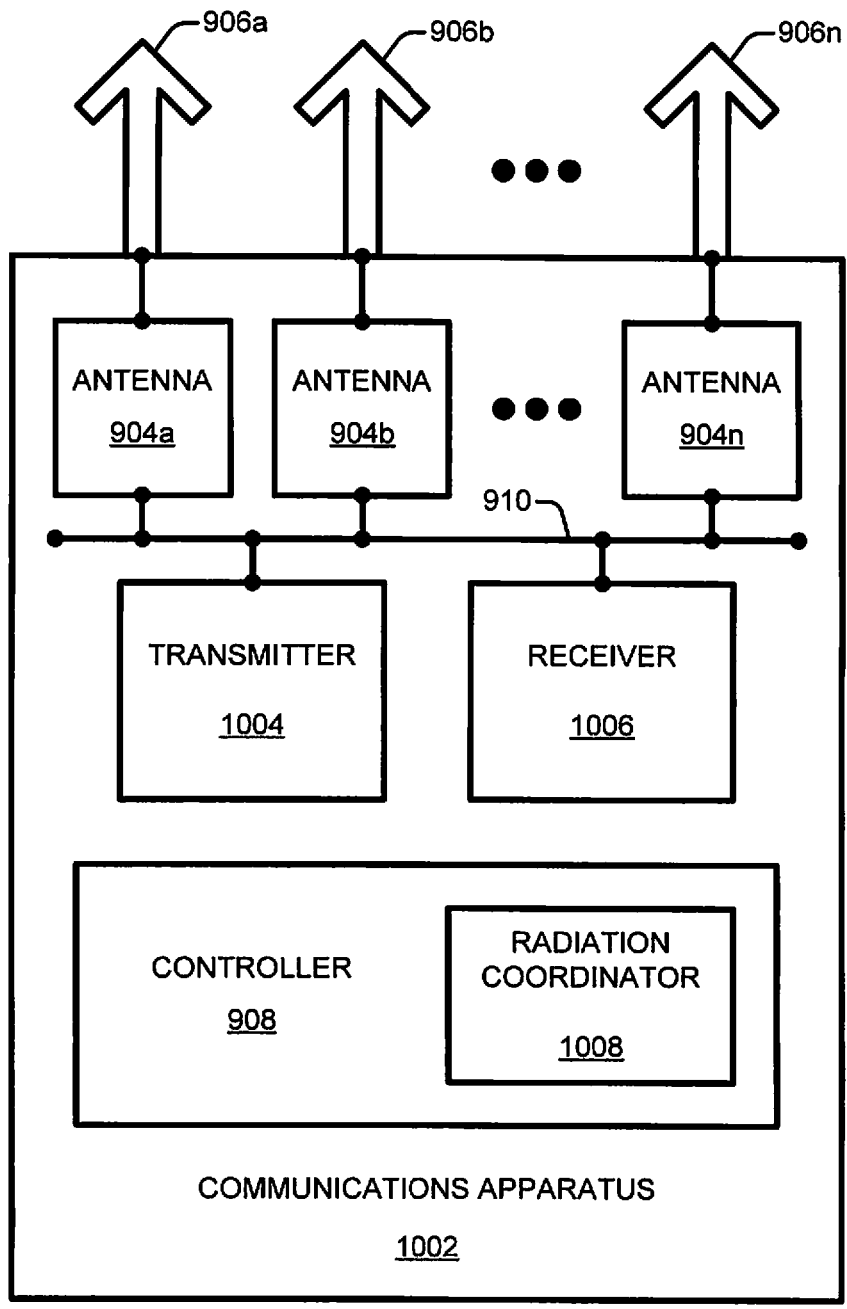
FIG. 10 is a block diagram of an example communications apparatus having "n" antennas that may operate in conjunction with a CoMP cell to coordinate multipoint wireless communications.

FIG. 10 is a block diagram of an example communications apparatus 1002 having "n" antennas 904 that may operate in conjunction with a cell (e.g., CoMP cell 902 of FIG. 9) to coordinate multipoint wireless communications. As illustrated, communications apparatus 1002 includes controller 908, backhaul 910, at least one transmitter 1004, at least one receiver 1006, and a radiation coordinator 1008. There are "n" antennas 904a, 904b . . . 904n, with "n" representing a positive integer. Communications apparatus 1002 produces emanated radiation 906a, 906b . . . 906n from respective antennas 904a, 904b . . . 904n.

Generally, communications apparatus 1002 may be considered a (distributed) network communications node. Network communication nodes may include, for example, a base transceiver station, a radio base station, a Node B, an access point, and so forth. It should be understood that a single communications apparatus 1002 may function in a transmitting mode at one moment and/or with respect to one communication or remote terminal and in a receiving mode at another moment and/or with respect to another communication or remote terminal. Thus, a cellular system may be formed from multiple distributed communications apparatuses 1002.

In an example embodiment, a system for coordinated multipoint wireless communication includes a first communications apparatus 1002 and a second communications apparatus 1002. The first communications apparatus includes multiple antennas 904 to emanate radiation 906 from multiple locations in an inwardly direction for a first cell 900 (e.g., of FIG. 9). The first communications apparatus includes a first controller 908 having a first radiation coordinator 1008 to coordinate emanation of the radiation via the multiple antennas of the first communications apparatus. The coordination is effected so as to reduce intra-cell interference for remote terminals that are located within the first cell.

The second communications apparatus includes multiple antennas 904 to emanate radiation 906 from multiple locations in an inwardly direction for a second cell 900. The second communications apparatus includes a second controller 908 having a second radiation coordinator 1008 to coordinate emanation of the radiation via the multiple antennas of the second communications apparatus. The coordination is effected so as to reduce intra-cell interference for remote terminals located within the second cell.

As described herein above and further demonstrated by radiation patterns 600 (of FIG. 6), the inward directions of the radiation reduce the inter-cell interference. More specifically, interference in the first cell by the radiation of the second cell is mitigated by the inward direction of the emanations from the multiple antennas of the second communications apparatus. Furthermore, interference in the second cell by the radiation of the first cell is mitigated by the inward direction of the emanations from the multiple antennas of the first communications apparatus.

With reference to FIGS. 4-5 and 7-8, it is apparent that the locations of the antennas are positioned along cell borders and that some antennas from different cells are co-located with one other (e.g., as sector antennas shared between or among cells). Thus, in an example implementation for a system in which the first cell is adjacent to the second cell, the first cell is associated with a first cell border, and the second cell is associated with a second cell border. The multiple locations of the multiple antennas of the first communications apparatus are at multiple positions along the first cell border, and the multiple locations of the multiple antennas of the second communications apparatus are at multiple positions along the second cell border. With this system, at least one antenna of the multiple antennas of the first communications apparatus may be co-located at a single position with at least one antenna of the multiple antennas of the second communications apparatus.

Figure 11:
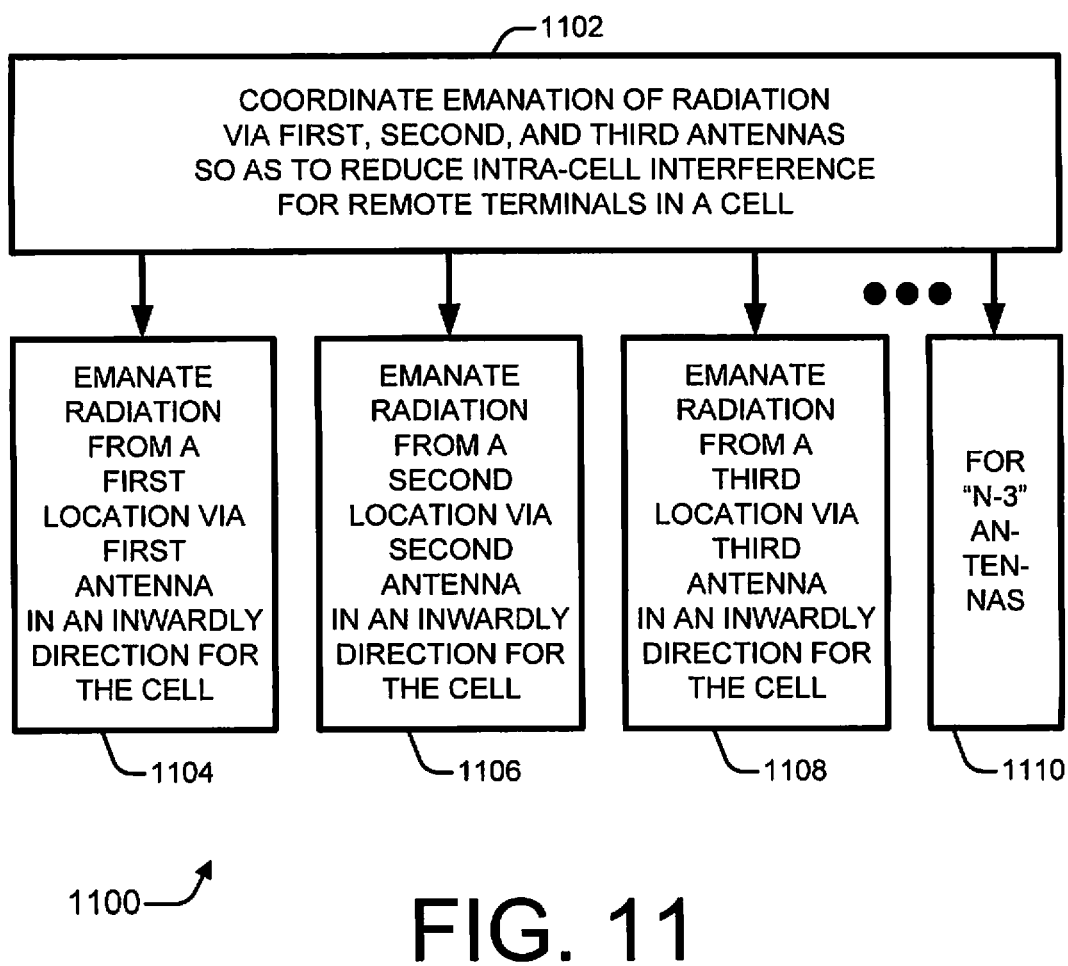
FIG. 11 is a flow diagram of an example method for coordinating multipoint wireless communications.

FIG. 11 is a flow diagram 1100 of an example method for coordinating multipoint wireless communications. As illustrated, flow diagram 1100 includes five blocks 1102-1110. Flow diagram 1100 may be implemented by an apparatus, such as a distributed communications apparatus 1002 (of FIG. 10). Example embodiments for the acts of flow diagram 1100 are described below with reference to other FIGS. (e.g., FIGS. 9 and 10), but the acts may alternatively be performed by other elements.

The acts of flow diagram 1100 may be effectuated with processor-executable instructions. Processor-executable instructions may be embodied as hardware, firmware, software, fixed or hard-coded logic circuitry, combinations thereof, and so forth. Example operational implementations of processor-executable instructions include, but are not limited to, a memory coupled to a processor, an application-specific integrated circuit (ASIC), a digital signal processor and associated code, some combination thereof, and so forth.

The acts of flow diagram 1100 that are described herein may be performed in many different environments and with a variety of different apparatuses and systems (e.g., in addition to the CoMP cell organizations of FIGS. 4-5 and 7-8 and the cells and apparatuses of FIGS. 9 and 10). The order in which the method is described is not intended to be construed as a limitation, and any number of the described blocks can be combined, augmented, rearranged, and/or omitted to implement a respective method, or an alternative method that is equivalent thereto. For example, the acts may be performed fully or partially simultaneously and/or in different orders from those that are illustrated.

In an example embodiment, flow diagram 1100 depicts a method for coordinating multipoint wireless communications. The method includes acts of emanating radiation from first, second, and third antennas and coordinating the radiation emanations.

At block 1102, radiation emanations via a first antenna, a second antenna, and a third antenna are coordinated so as to reduce intra-cell interference for remote terminals located within a cell. For example, controller 908 may coordinate the radiation emanations 906a,b,c that are transmitted from first, second, and third antennas 904a, 904b, and 904c respectively so as to reduce intra-cell interference within CoMP cell 900. Emanations from more than three antennas, as represented by block 1110, may also be coordinated. Controller 908 may determine what each antenna is to transmit based, e.g., on some environmental information. For instance, the intra-cell interference for remote terminals 912 that are located within the CoMP cell may be reduced by separating wireless communications spatially, in frequency, and/or with a coding mechanism. Other CoMP-related techniques for intra-cell interference reduction are described herein, especially reference to FIG. 9.

At block 1104, radiation is emanated from a first location via the first antenna in an inwardly direction for the cell. For example, radiation 906a may be radiated from a first location via first antenna 904a in an inwardly direction for CoMP cell 900. At block 1106, radiation is emanated from a second location via the second antenna in an inwardly direction for the cell. For example, radiation 906b may be radiated from a second location via second antenna 904b in an inwardly direction for CoMP cell 900. At block 1108, radiation is emanated from a third location via the third antenna in an inwardly direction for the cell. For example, radiation 906c may be radiated from a third location via a third antenna 904c in an inwardly direction for a CoMP cell 900.

The acts of blocks 1104-1108 (and block 1110) may be performed fully or partially in parallel. For an UL implementation, the coordination of block 1102 is performed after radiation reception. As described herein above, a CoMP cell may have more (or fewer) than three antennas and associated sub-cells. As represented by block 1110, radiation emanations from "n-3" antennas (for a total of "n" antennas) may be performed in conjunction with the coordinated emanation of block 1102.

In an example implementation with nine antennas, radiation is emanated from nine antennas and the emanated radiation is coordinated across the nine antennas, including the first, second, and third antennas. More specifically, radiation is emanated via a fourth antenna, a fifth antenna, a sixth antenna, a seventh antenna, an eighth antenna, and a ninth antenna in inwardly directions for the cell. The radiation emanated via the first, second, third, fourth, fifth, sixth, seventh, eighth, and ninth antennas is coordinated so as to reduce the intra-cell interference for the remote terminals located within the cell.

As noted above, a CoMP cell as described herein may operate in both UL and DL modes. In an example implementation of an UL mode, the method may further include acts of receiving radiation via the first, second, and third antennas and coordinating the radiation receptions. More specifically, radiation is received at the first location via the first antenna with a focus on an inward direction of the cell. Radiation is received at the second location via the second antenna with a focus on an inward direction of the cell. Radiation is received at the third location via the third antenna with a focus on an inward direction of the cell. Also, the reception of the radiation via the first antenna, the second antenna, and the third antenna is coordinated so as to reduce intra-cell interference from other the remote terminals located within the cell.

Different embodiment(s) of the invention can offer one or more advantages. Generally, multiple described embodiments involve implementing CoMP techniques in cells in which multiple antennas are located at cell borders and in which the radiation that is emanating from the antennas is directed inward. An advantage of certain embodiment(s) of the present invention is that ICI in cellular systems with multiple antenna sites per cell may be reduced. Another advantage of certain embodiment(s) of the present invention is that a reduced ICI can boost SIRs in regions near cell borders.

Yet another advantage of certain embodiment(s) of the present invention is that higher data rates may be provided in cells with multiple antenna sites using closed borders (e.g., as shown in FIG. 4). Still yet another advantage of certain embodiment(s) of the present invention is that higher data rates may be provided in cells with multiple antenna sites using sector rotation to orient antennas such that radiation is directed inward (e.g., as shown in FIG. 8).

The systems, acts, features, functions, methods, schemes, apparatuses, operations, components, etc. of FIGS. 4-11 are illustrated in diagrams that are divided into multiple blocks and other elements. However, the order, interconnections, interrelationships, layout, etc. in which FIGS. 4-11 are described and/or shown are not intended to be construed as a limitation, and any number of the blocks and/or other elements may be modified, combined, rearranged, augmented, omitted, etc. in many manners to implement one or more systems, methods, devices, media, apparatuses, arrangements, etc. for coordinating multipoint wireless communications.

Although multiple embodiments of the present invention have been illustrated in the accompanying Drawings and described in the foregoing Detailed Description, it should be understood that the invention is not limited to the disclosed embodiments, for it is also capable of numerous rearrangements, modifications and substitutions without departing from the scope of the invention as set forth and defined by the following claims.

What is claimed is:

1. An apparatus for coordinated multipoint wireless communication, the apparatus comprising:
   a first antenna to emanate radiation from a first location located in an inwardly direction for a cell;
   a second antenna to emanate radiation from a second location in an inwardly direction for the cell;
   a third antenna to emanate radiation from a third location in an inwardly direction for the cell; and a controller to coordinate emanation of the radiation via the first antenna, the second antenna, and the third antenna so as to reduce intra-cell interference for remote terminals located within the cell, wherein the first antenna, the second antenna, and the third antenna comprise beamforming antennas; and wherein the cell is associated with a cell border; and wherein the first location is at a first position along the cell border, the second location is at a second position along the cell border, and the third location is at a third position along the cell border.

2. The apparatus as recited in claim 1, wherein at least a portion of the cell border is behind the first antenna in relation to the inward direction for the cell at which the radiation is emanated via the first antenna.

3. The apparatus as recited in claim 1, wherein the apparatus comprises a distributed apparatus; and wherein the first antenna, the second antenna, and the third antenna are connected to the controller over at least one backhaul.

4. The apparatus as recited in claim 1, wherein the first antenna, the second antenna, and the third antenna comprise antenna arrays including beamforming antennas.

5. The apparatus as recited in claim 1, further comprising:
a fourth antenna located on a cell border to emanate radiation from a fourth location in an inwardly direction for the cell;
wherein the controller is to coordinate emanation of the radiation via the first antenna, the second antenna, the third antenna, and the fourth antenna so as to reduce intra-cell interference for the remote terminals located within the cell.

6. The apparatus as recited in claim 1, wherein the cell comprises a first sub-cell, a second sub-cell, and a third sub-cell; and wherein the first antenna is to emanate radiation from the first location in an inwardly direction for the first sub-cell, the second antenna is to emanate radiation from the second location in an inwardly direction for the second sub-cell, and the third antenna is to emanate radiation from the third location in an inwardly direction for the third sub-cell.

7. The apparatus as recited in claim 6, wherein the first sub-cell comprises a first sector, the second sub-cell comprises a second sector, and the third sub-cell comprises a third sector.

8. The apparatus as recited in claim 7, wherein the first sector comprises a substantially symmetrical sector having a center; and wherein the first antenna is to emanate radiation from the first location in an inwardly direction that is approximately towards the center of the substantially symmetrical sector.

9. The apparatus as recited in claim 1, wherein the controller is to reduce the intra-cell interference for the remote terminals that are located within the cell by separating wireless communications spatially, in frequency, or with a coding mechanism.

10. The apparatus as recited in claim 1, wherein:
the first antenna at the first location is to receive radiation with a focus on an inward direction of the cell;
the second antenna at the second location is to receive radiation with a focus on an inward direction of the cell;
the third antenna at the third location is to receive radiation with a focus on an inward direction of the cell; and
the controller is to coordinate reception of the radiation via the first antenna, the second antenna, and the third antenna so as to reduce intra-cell interference from the remote terminals located within the cell.

11. A method for coordinated multipoint wireless communication, the method comprising acts of:

emanating radiation from a first location on a first cell border via a first antenna in an inwardly direction for a cell wherein at least a portion of the cell border is behind the first antenna in relation to the inward direction for the cell at which the radiation is emanated via the first antenna;

emanating radiation from a second location on a second cell border via a second antenna in an inwardly direction for the cell;

emanating radiation from a third location on a third cell border via a third antenna in an inwardly direction for the cell; and coordinating the emanating of the radiation via the first antenna, the second antenna, and the third antenna so as to reduce intra-cell interference for remote terminals located within the cell, wherein the first antenna, the second antenna, and the third antenna comprise antenna arrays including beamforming antennas; and wherein the cell is associated with a cell border; and wherein the first location is at a first position along the cell border, the second location is at a second position along the cell border, and the third location is at a third position along the cell border.

12. The method as recited in claim 11, further comprising:
emanating radiation via a fourth antenna, a fifth antenna, a sixth antenna, a seventh antenna, an eighth antenna, and a ninth antenna in inwardly directions for the cell; and
coordinating the emanating of the radiation via the first, second, third, fourth, fifth, sixth, seventh, eighth, and ninth antennas so as to reduce intra-cell interference for remote terminals located within the cell.

13. The method as recited in claim 12, wherein the fourth antenna shares the first location, and the fifth antenna shares the second location.

14. The method as recited in claim 11, further comprising:
emanating radiation via n−3 antennas in inwardly directions for the cell, with n being a positive integer greater than three; and
coordinating the emanating of the radiation via the n−3 antennas so as to reduce intra-cell interference for remote terminals located within the cell.

15. The method as recited in claim 11, further comprising:
receiving radiation at the first location via the first antenna with a focus on an inward direction of the cell;
receiving radiation at the second location via the second antenna with a focus on an inward direction of the cell;
receiving radiation at the third location via the third antenna with a focus on an inward direction of the cell; and
coordinating the receiving of the radiation via the first antenna, the second antenna, and the third antenna so as to reduce intra-cell interference from the remote terminals located within the cell.

16. The method as recited in claim 11, wherein the act of coordinating comprises:
reducing the intra-cell interference for the remote terminals that are located within the cell by separating wireless communications spatially, in frequency, or with a coding mechanism.

17. A system for coordinated multipoint wireless communication, the system comprising:
a first communications apparatus including multiple antennas each located on a cell border to emanate radiation from multiple locations in an inwardly direction for a first cell, the first communications apparatus including a first controller to coordinate emanation of the radiation via the multiple antennas of the first communications apparatus so as to reduce intra-cell interference for remote terminals located within the first cell; and a second communications apparatus including multiple antennas each located on a cell border to emanate radiation from multiple locations in an inwardly direction for a second cell, the second communications apparatus including a second controller to coordinate emanation of the radiation via the multiple antennas of the second communications apparatus so as to reduce intra-cell interference for remote terminals located within the second cell, wherein the multiple antennas of the first communications apparatus and the multipole antennas of the second communications apparatus comprise antenna arrays including beamforming antennas; and wherein the cell is associated with a cell border; and wherein the first location is at a first position along the cell border, the second location is at a second position along the cell border, and the third location is at a third position along the cell border.

18. The system as recited in claim 17, wherein interference in the first cell by the radiation of the second cell is mitigated by the inward direction of the emanations from the multiple antennas of the second communications apparatus; and wherein interference in the second cell by the radiation of the first cell is mitigated by the inward direction of the emanations from the multiple antennas of the first communications apparatus.

19. The system as recited in claim 17, wherein the first cell is associated with a first cell border, and the second cell is associated with a second cell border; wherein the multiple locations of the multiple antennas of the first communications apparatus are at multiple positions along the first cell border, and the multiple locations of the multiple antennas of the second communications apparatus are at multiple positions along the second cell border; wherein the first cell is adjacent to the second cell; and wherein at least one antenna of the multiple antennas of the first communications apparatus is co-located at a single position with at least one antenna of the multiple antennas of the second communications apparatus.

20. The system as recited in claim 17, wherein the first cell includes multiple sub-cells; and wherein each respective antenna of the multiple antennas of the first communications apparatus emanates radiation in an inwardly direction for a respective sub-cell of the multiple sub-cells.

* * * * *